United States Patent
Spitzer (10) Patent No.: US 7,623,866 B1
(45) Date of Patent: Nov. 24, 2009

(54) AUTOMATIC GENERATION OF NEIGHBOR LISTS IN A WIRELESS NETWORK

(75) Inventor: Roy L. Spitzer, Rockville, MD (US)

(73) Assignee: Sprint Spectrum L.P., Overland Park, KS (US)

( * ) Notice: Subject to any disclaimer, the term of this patent is extended or adjusted under 35 U.S.C. 154(b) by 541 days.

(21) Appl. No.: 11/484,001

(22) Filed: Jul. 10, 2006

(51) Int. Cl.
*H04W 36/00* (2006.01)

(52) U.S. Cl. .................. 455/442; 455/437; 455/444

(58) Field of Classification Search ........... 455/436, 455/437, 438, 439, 440, 441, 442, 443, 444, 455/446
See application file for complete search history.

(56) References Cited

U.S. PATENT DOCUMENTS

| | | | |
|---|---|---|---|
| 5,197,093 A | 3/1993 | Knuth et al. | |
| 5,612,948 A | 3/1997 | Fette et al. | |
| 5,617,059 A | 4/1997 | Eggleston | |
| 5,809,398 A | 9/1998 | Moberg et al. | |
| 5,898,382 A | 4/1999 | Treatch | |
| 5,987,304 A | 11/1999 | Latt | |
| 6,119,005 A | 9/2000 | Smolik | 455/436 |
| 6,132,306 A | 10/2000 | Trompower | |
| 6,289,724 B1 | 9/2001 | Varma et al. | |
| 6,360,098 B1 | 3/2002 | Ganesh et al. | 455/436 |
| 6,404,775 B1 | 6/2002 | Leslie et al. | |
| 6,463,298 B1 | 10/2002 | Sorenson et al. | |
| 6,477,354 B1 | 11/2002 | Roberts et al. | |
| 6,487,426 B1 | 11/2002 | Haber | |
| 6,542,741 B2 | 4/2003 | Wallstedt et al. | 455/434 |
| 6,571,284 B1 | 5/2003 | Suonvieri | |
| 6,658,269 B1 | 12/2003 | Golemon et al. | |
| 6,690,915 B1 | 2/2004 | Ito et al. | |
| 6,697,603 B1 | 2/2004 | Lovinggood et al. | |
| 6,735,432 B1 | 5/2004 | Jarett et al. | |
| 6,754,196 B1 | 6/2004 | Daane et al. | |

(Continued)

FOREIGN PATENT DOCUMENTS

WO    WO 98/53621 A2    11/1998

(Continued)

OTHER PUBLICATIONS

Office Action from U.S. Appl. No. 11/257,661, mailed May 2, 2008.

(Continued)

*Primary Examiner*—Nick Corsaro
*Assistant Examiner*—Amanuel Lebassi (57) ABSTRACT

Methods and systems are provided for automatic generation of neighbor lists in a wireless network. A first message is received from an overlapped base station. The overlapped base station has a first coverage area, and the first message comprises a location of the overlapped base station. Responsive to receiving the first message, a set of overlapping base stations is identified based at least in part on the location of the overlapped base station. Each overlapping base station has (i) a coverage area that overlaps the first coverage area and (ii) a neighbor list that includes a neighbor set of one or more neighboring base stations of that overlapping base station. A first neighbor list is generated and sent to the overlapped base station. The first neighbor list comprises of the union of the set of overlapping base stations and the neighbor set of each overlapping base station.

19 Claims, 8 Drawing Sheets

U.S. PATENT DOCUMENTS

| | | |
|---|---|---|
| 6,993,287 B2 | 1/2006 | O'Neill |
| 7,006,797 B1 | 2/2006 | Sullivan et al. |
| 7,035,587 B1 | 4/2006 | Yarkosky |
| 7,046,964 B1 | 5/2006 | Sullivan et al. |
| 7,190,937 B1 | 3/2007 | Sullivan et al. |
| 7,299,005 B1 | 11/2007 | Yarkosky et al. |
| 7,457,584 B2 | 11/2008 | Baker et al. |
| 7,480,485 B1 | 1/2009 | Oh et al. |
| 2001/0031621 A1 | 10/2001 | Schmutz |
| 2001/0036837 A1 | 11/2001 | Uistola |
| 2002/0044594 A1 | 4/2002 | Bongfeldt |
| 2002/0045431 A1 | 4/2002 | Bongfeldt |
| 2002/0183039 A1 | 12/2002 | Padgett et al. |
| 2002/0186749 A1 | 12/2002 | Jones |
| 2003/0083069 A1 | 5/2003 | Vadgama |
| 2003/0114103 A1 | 6/2003 | Dinkel et al. |
| 2003/0176192 A1 | 9/2003 | Morimoto et al. |
| 2003/0211828 A1 | 11/2003 | Dalgleish et al. |
| 2004/0106408 A1 | 6/2004 | Beasley et al. ............. 455/436 |
| 2004/0152480 A1* | 8/2004 | Willars et al. ............... 455/513 |
| 2004/0204097 A1 | 10/2004 | Scheinert et al. |
| 2004/0235478 A1* | 11/2004 | Lindquist et al. ............ 455/440 |
| 2005/0148368 A1 | 7/2005 | Scheinert et al. |
| 2005/0227619 A1 | 10/2005 | Lee et al. |
| 2008/0002628 A1* | 1/2008 | Bi et al. ..................... 370/335 |

FOREIGN PATENT DOCUMENTS

| | | |
|---|---|---|
| WO | WO 98/53621 A3 | 11/1998 |
| WO | WO 2005/011150 A1 | 2/2005 |

OTHER PUBLICATIONS

Non-final Office Action in U.S. Appl. No. 11/236,351, mailed Oct. 10, 2007.
U.S. Appl. No. 11/257,661, filed Oct. 25, 2005, Sill et al.
U.S. Appl. No. 11/257,648, filed Oct. 25, 2005, Sill et al.
U.S. Appl. No. 11/236,351, filed Sep. 27, 2005, Sill et al.
U.S. Appl. No. 11/449,527, filed Jun. 8, 2006, Oh et al.
Spotwave Wireless, Inc., SpotCell™ 112 (PCS-CDMA), "Product Overview," www.spotwave.com, 2003.
Steve Adams, "The Demands on In-Building Solutions—Using smart antennas and adaptive techniques to improve in-building technique", Wireless Business & Technology Magazine, May 20, 2003.
U.S. Appl. No. 10/753,941, filed Jan. 7, 2004.
U.S. Appl. No. 10/753,942, filed Jan. 7, 2004.
Final Office Action from U.S. Appl. No. 11/257,661, mailed Nov. 26, 2008.
Non-Final Office Action from U.S. Appl. No. 11/257,648, mailed Dec. 30, 2008.

* cited by examiner

AUTOMATIC GENERATION OF NEIGHBOR LISTS IN A WIRELESS NETWORK

BACKGROUND

1. Technical Field

The present invention relates to wireless communications and, more particularly, to configuration of base stations in wireless networks.

2. Description of Related Art

More people than ever are using mobile stations, such as cell phones and personal digital assistants (PDAs), to connect to wireless networks, which are also referred to as wireless wide area networks (WWANs), cellular communication systems, radio access networks (RANs), wireless access networks, and by other names. Service providers typically operate these wireless networks to provide both voice and data services using a wireless communication format such as Code Division Multiple Access (CDMA), or another format.

In a typical wireless network, service providers operate multiple base stations, each typically including one or more towers or antennas that radiate to define a coverage area within which mobile stations may communicate with the base station over a radio frequency (RF) air interface. The base stations then act as conduits for signaling and bearer communications between the mobile stations and one or more signaling and/or transport networks, over which the mobile stations may communicate with other devices.

As a general matter, a base station may take the form of a device known as a base transceiver station (BTS), or perhaps encompass one or more BTSs controlled by a device known as a base station controller (BSC). A BTS may also be referred to as a Node-B, and a BSC may also be referred to as a Radio Network Controller (RNC); BTS and BSC are used herein as examples and for clarity of presentation. The base station may provide connectivity for the mobile station with a device known as a mobile switching center (MSC) and/or a device known as a packet data serving node (PDSN). The MSC generally acts as a switch, connecting the base station to one or more circuit-switched signaling and/or transport networks, while the PDSN would generally connect the base station to a packet-data network. Note that a base station may, instead or in addition, provide connectivity with such devices as a Soft-Switch, an IP Multimedia Subsystem (IMS), a Multimedia Domain (MMD), as well as other examples.

Furthermore, different types of base stations may be deployed in a wireless network. Typically, the most common base station is what is known as a macro base station, which would have a relatively large coverage area and provide service to a relatively large number of mobile stations. A macro base station may transmit with a power of approximately 20 watts. Macro base stations are typically arranged such that their respective coverage areas overlap, if at all, only slightly, such that, taken together, the combined coverage areas of the macro base stations blanket a particular geographic area with substantially complete wireless-network service.

Moreover, wireless networks may also incorporate smaller base stations, known as pico base stations, having a smaller coverage area than a typical macro base station and, at any given time, providing service to a smaller number of mobile stations. A pico base station may transmit with a power of only about 50 milliwatts. Pico base stations may be used for providing service to a particular building, such as a particular residence. In general, pico base stations may be placed anywhere with respect to the coverage areas of the macro base stations in the network, and thus may be characterized as "underlaying" the macro network; that is, the coverage area of a pico base station may be overlapped by the coverage area of one or more macro base stations. Note also that a given pico base station may be connected to the same network infrastructure elements—such as the same BSC for example—as one or more macro base stations, but may also or instead be connected with separate network infrastructure elements.

From time to time, a mobile station that is in communication with a given base station may cooperate with the network to perform a "handoff," by which the mobile station switches to communicating with a neighboring base station. To inform mobile stations as to their handoff options, base stations typically broadcast a "neighbor list," which may include pseudo-random-number (PN) offsets in use by neighboring base stations. In general, a PN offset is a numerical code that base stations use to encode—and mobile stations use to decode—information transmitted over an air interface. Typically, it is by PN offset that mobile stations distinguish among base stations, or among various sectors of a given base station.

SUMMARY

Methods and systems are provided for automatic generation of neighbor lists in a wireless network. A given base station, which may be a pico base station, may determine its location, and convey that location to a network entity, which then generates a neighbor list for the given base station and transmits that generated neighbor list to the given base station. The content of that neighbor list will be based at least in part on the location of the given base station. The network entity will use that location, and perhaps other information, to identify a set of base stations, which may be macro base stations, whose coverage areas overlap the coverage area of the given base station. The network entity will also have or acquire information as to the neighbor lists of those overlapping base stations. The network entity will generate the neighbor list for the given base station to include the union of the set of overlapping base stations and the sets of base stations listed on the overlapping base stations' neighbor lists. The network entity may also augment the neighbor lists of the overlapping base stations to include the given base station.

Thus, an exemplary embodiment may take the form of a method. In accordance with the method, a first message is received from an overlapped base station. The overlapped base station has a first coverage area, and the first message comprises a location of the overlapped base station. Responsive to receiving the first message, a set of one or more overlapping base stations is identified based at least in part on the location of the overlapped base station. Each overlapping base station has (i) a respective coverage area that overlaps the first coverage area and (ii) a respective neighbor list that includes a neighbor set of one or more neighboring base stations of that overlapping base station. A first neighbor list is generated for the overlapped base station. The first neighbor list comprises the union of the set of overlapping base stations and the neighbor set of each overlapping base station. A second message is sent to the overlapped base station. The second message comprises the first neighbor list.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

In accordance with exemplary embodiments of the present invention, a neighbor list will be automatically generated for a base station, such as a pico base station. One context where this may prove useful is in the configuration of a new pico base station in a wireless network. Once the pico base station is positioned in the location in which it will operate, it may be powered on. In response to this, or perhaps in response to some other trigger such as receiving a command from a technician or from a remote network entity, the pico base station may use an internal location module such as a Global Positioning System (GPS) receiver to determine its location.

The pico base station may then format a message that includes its determined location, and perhaps other data, such as an identifier of the pico base station, a power level of the pico base station, and/or identification of one or more macro base stations that the pico base station may detect, perhaps by making use of an internal CDMA chipset. The identifier for the pico base station could be, as examples, a serial number, a Media Access Control (MAC) address, an Internet Protocol (IP) address, some other identifier, or any combination of these. Similarly, the detected base stations may be identified in the message by any sort of identifier, such as any of those listed above, a PN offset, some other identifier, or any combination of these.

The pico base station may send the formatted message to a network entity such as an MSC via a wireless and/or wired packet-data connection, as examples. Upon receipt of this message, the MSC may identify a set of one or more base stations—such as macro base stations—whose coverage areas overlap the coverage area of the pico base station being configured. The MSC may access a coverage map that details the coverage areas of nearby macro base stations. The MSC may also access data as to the location and power of nearby macro base stations, and may infer or derive the coverage areas of nearby macro base stations based on this information.

Note that the identification of the set of overlapping base stations also involves consideration of the coverage area of the pico base station being configured. The MSC may determine the pico-base-station coverage area using the location of the pico base station. The MSC may also use an identifier—such as a serial number—of the pico base station to determine that this base station is, in fact, a pico base station. The pico base station may also include its power level in the message it sends to the MSC, and the MSC may use that information as well in determining the expected coverage area of the pico base station. If the pico base station includes information about other base stations that the pico base station detected, such as their PN offsets, detected power levels, etc., the MSC may use this data as corroboration as to which base stations should be included in the identified set of overlapping base stations.

Once the MSC identifies the set of overlapping base stations, it accesses neighbor lists for these base stations. The MSC may have these neighbor lists stored; alternatively, the MSC may acquire these neighbor lists from one or more databases, or perhaps from the overlapping base stations themselves. Each of these neighbor lists includes a neighbor set of one or more neighboring base stations of the particular overlapping base station in question.

Next, the MSC generates a neighbor list for the pico base station. The generated neighbor list includes the union of (i) the set of overlapping base stations and (ii) the neighbor sets from the neighbor lists of each of the overlapping base stations. Note that, in general, base stations may be referred to by any sort of identifier—or set of identifiers—in any of the neighbor lists mentioned herein, including the neighbor list that is generated for the pico base station. One commonly used identifier for this purpose may be a respective PN offset that each respective base station is using. Other identifiers may be used as well.

After generating the neighbor list for the pico base station, the MSC transmits that neighbor list to the pico base station. Again, this transmission may occur via a wireless and/or wired packet-data connection. Moreover, the MSC may also update the neighbor lists of the overlapping base stations, and perhaps also the base stations listed on the neighbor lists of the overlapping base stations, to include reference to the pico base station. The MSC may update a given neighbor list to include reference to the pico base station by sending a new neighbor list for a base station to use, where that new neighbor list includes the pico base station. As another possibility, the MSC could send an update message to a given base station, instructing that base station to add the pico base station to its neighbor list.

Note that, in general, a network entity other than an MSC, such as a BSC, an RNC, a SoftSwitch, an IMS, an MMD, a PDSN, a gateway, a switch, a router, a server, one or more other entities mentioned herein, or another entity or combination of entities may carry out the functions that are described herein as being carried out by the MSC, and that the MSC is used in this description by way of example.

2. Exemplary Architecture a. Exemplary Communication System

Figure 1:
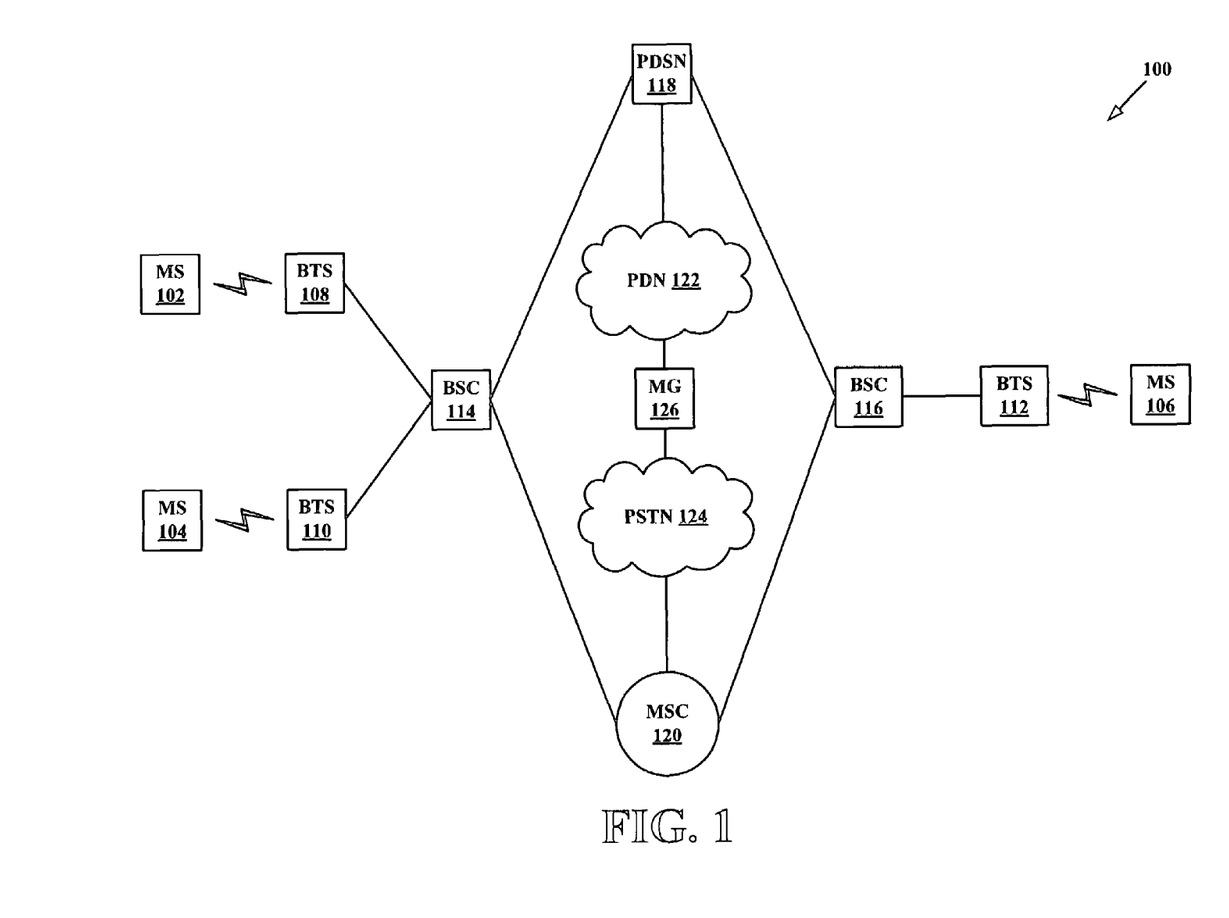
FIG. 1 is a simplified block diagram of a communication system that may be used in accordance with exemplary embodiments.

FIG. 1 is a simplified block diagram of a communication system that may be used in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes mobile stations (MS) 102, 104, and 106; base transceiver stations (BTS) 108, 110, and 112; base station controllers (BSC) 114 and 116; a packet data serving node (PDSN) 118; a mobile switching center (MSC) 120; a packet-data network (PDN) 122, a public switched telephone network (PSTN) 124, and a media gateway 126. It should be understood that any number of network entities not shown in FIG. 1 could be present as well. As examples, there could be any number of mobile stations and other devices in communication with BTS 108, PDN 122, and PSTN 124. Furthermore, there could be any number of intermediate devices and networks making up all or part of any of the communication links. For example, there could be one or more routers or other devices on the communication link between PDSN 118 and PDN 122.

Mobile stations 102, 104, and 106 may be any mobile devices capable of communicating with one or more base stations, and of carrying out the mobile-station functions described herein. As an example, mobile stations 102, 104, and 106 may communicate with base stations over a radio-frequency (RF) air interface using a protocol such as CDMA. As examples, one, some, or all of mobile stations 102, 104, and 106 may be a cell phone, PDA, or laptop computer.

BTSs 108, 110, and 112 may be any base transceiver stations capable of communicating over an RF air interface with multiple mobile stations using a protocol such as CDMA, or some other air interface protocol. BTSs 108, 110, and 112 may each comprise one or more antennas that radiate to define respective coverage areas. BTSs 108, 110, and 112 may each further comprise a communication interface for communicating with a BSC, as well as a processor and data storage comprising program instructions executable by the processor for carrying out the BTS functions described herein. BTSs 108 and 110 may be communicatively coupled with BSC 114, and in turn with PDSN 118 and MSC 120, while BTS 112 may be communicatively coupled with BSC 116, and in turn with PDSN 118 and MSC 120. BTS 108 is further described in connection with FIG. 2.

BSCs 114 and 116 may be any base station controllers capable of communicating with one or more BTSs, as well as with one or more PDSNs, and one or more MSCs. BSC 114 may be communicatively coupled with at least BTS 108, BTS 110, PDSN 118, and MSC 120. BSC 116 may be communicatively coupled with at least BTS 112, PDSN 118, and MSC 120. Each of BSC 114 and BSC 116 may comprise a communication interface for communicating with the aforementioned devices, as well as a processor and data storage comprising program instructions executable by the processor for carrying out the BSC functions described herein.

Note that the term "base station" as used herein may refer to a particular BTS such as BTS 108. However, "base station" may also refer to a combination of a BTS and a BSC, such as the combination of BTS 112 and BSC 116. Furthermore, the arrangement of the BTSs and BSCs in FIG. 1 is exemplary in nature and is not meant to convey geographic relation. That is, BTS 108, BTS 110, and BTS 112 could all be neighboring BTSs with respect to each other. The network arrangement of FIG. 1 is also meant to convey that more than one BTS could be controlled by a BSC: BTS 108 and BTS 110 could be controlled by BSC 114. Also, a given PDSN or MSC could communicate with more than one BSC: PDSN 118 and MSC 120 each communicate with both BSC 114 and BSC 116. And other arrangements are possible.

PDSN 118 may be any networking device having a communication interface for communicating with BSC 114, BSC 116, and PDN 122, a processor, and data storage comprising program instructions executable by the processor for carrying out the PDSN functions described herein. PDSN 118 may function to provide packet-data connectivity between BSC 114 and PDN 122, between BSC 116 and PDN 122, and perhaps between BSC 114 and BSC 116. PDSN 118 may include network-access-server functionality that enables mobile stations, such as mobile stations 102, 104, and 106, to send packet data to and receive packet data from PDN 122. As one example, mobile station 104 may be equipped to participate in packet-based communication sessions such as Voice over IP (VoIP) sessions via PDSN 118 and PDN 122.

MSC 120 may be any networking device having a communication interface for communicating with BSC 114, BSC 116, and PSTN 124, a processor, and data storage comprising program instructions executable by the processor for carrying out the MSC functions described herein. MSC 120 may function as a switching element, providing mobile stations, such as mobile stations 102, 104, and 106, with the ability to place and receive calls over PSTN 124. As an example, mobile station 102 may be able to participate in voice calls via MSC 120 and PSTN 124. MSC 120 may also function as a neighbor-list controller in accordance with the present invention. For example, MSC 120 may carry out the later-described method 400. MSC 120 is further described in connection with FIG. 3.

PDN 122 may be communicatively coupled with at least PDSN 118 and media gateway 126, as well as with one or more additional network entities, and may include one or more wide area networks, one or more local area networks, one or more public networks such as the Internet, one or more private networks, and/or one or more wired or wireless networks. Devices in communication with PDN 122 may exchange data using a packet-switched protocol such as the Internet Protocol (IP), and may be identified by an address such as an IP address. PSTN 124 may be the circuit-switched network known as the Public Switched Telephone Network, and may be communicatively coupled with at least MSC 120 and media gateway 126.

Media gateway 126 may be any networking device arranged to pass communications between PDN 122 and PSTN 124, and may thus have one interface for communicating with PDN 122 and another interface for communicating with PSTN 124. Media gateway 126 may receive packet-based communications from PDN 122, convert those communications to a circuit-switched format, and transmit those communications to PSTN 124. Media gateway 126 may also receive circuit-switched communications from PSTN 124, convert those communications to a packet-based format, and transmit those communications to PDN 122.

b. Exemplary Base Transceiver Station

Figure 2:
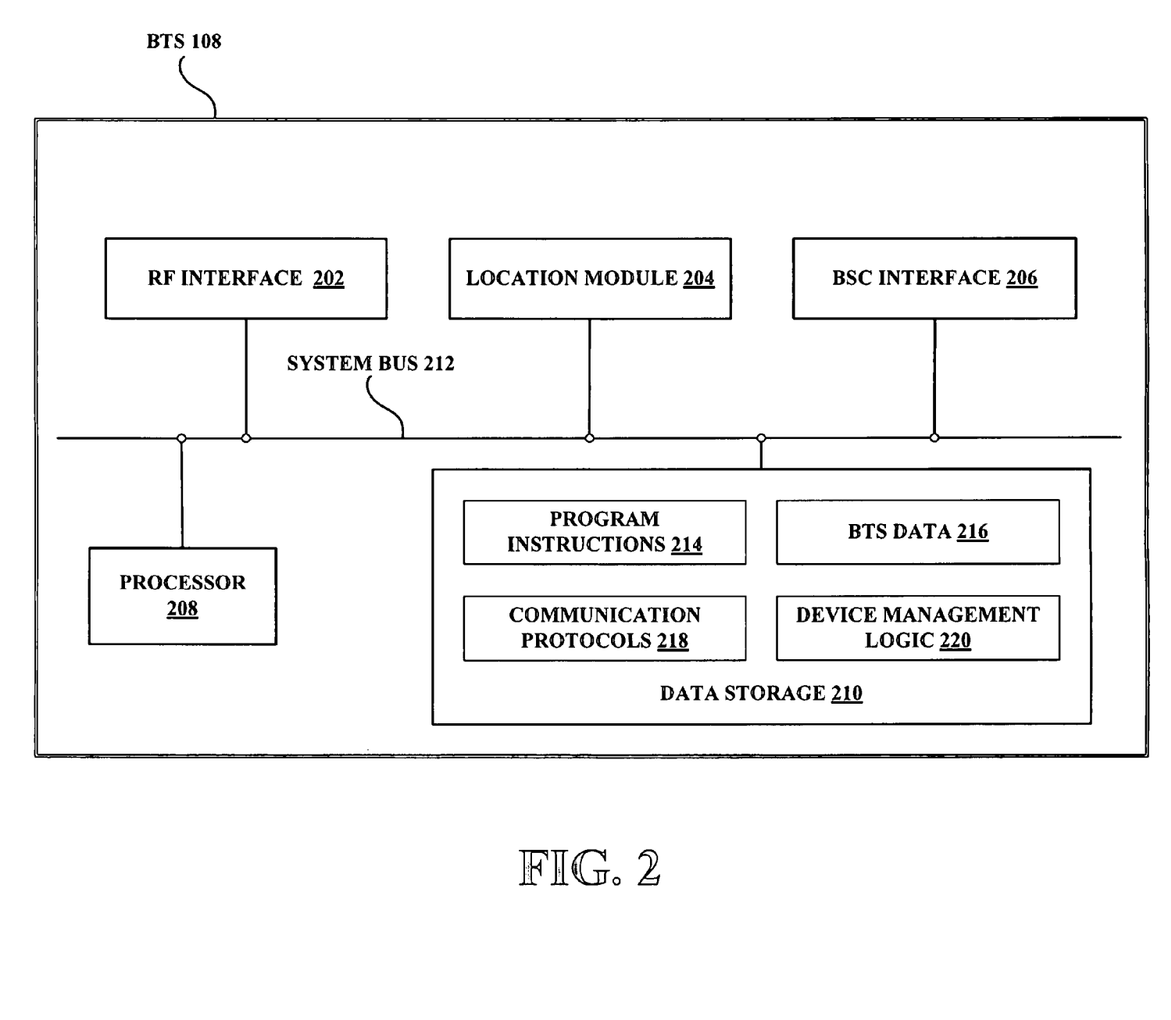
FIG. 2 is a simplified block diagram of an exemplary base transceiver station (BTS) that may be used in accordance with exemplary embodiments.

FIG. 2 is a simplified block diagram of an exemplary base transceiver station (BTS) that may be used in accordance with exemplary embodiments. In particular, FIG. 2 shows that BTS 108 of FIG. 1 includes an RF interface 202, a location module 204, a BSC interface 206, a processor 208, and data storage 210, all of which may be communicatively linked by a system bus 212. BTS 108 may be any device arranged to communicate with one or more mobile stations and a BSC, and to carry out the BTS functions described herein.

RF interface 202 may comprise antennas that radiate to define a wireless coverage area, within which mobile stations may communicate with BTS 108 according to an air interface protocol. Examples of such protocols include CDMA, Advanced Mobile Phone Service (AMPS), Time Division Multiple Access (TDMA), and Global System for Mobile communication (GSM). As an example, the protocol could comply with the standards IS-95 and cdma2000®, which are incorporated by reference. For carrying out certain BTS functions described herein, such as detecting neighboring BTSs and identifying their operational parameters, as well as sending and receiving messages, RF interface 202 may also include a chipset, such as a CDMA-enabled chipset for example, similar to that found in mobile stations.

Location module 204 may include any combination of hardware, software, and/or firmware that BTS 108 may use to obtain measurements of its position. As examples, location module 204 could include a GPS receiver and/or a Wide Area Augmentation System (WAAS) receiver, which may be used in conjunction with a GPS receiver to enhance the accuracy of positioning determinations. Location module 204 may use information received from the GPS receiver of a WAAS to enhance location accuracy.

BSC interface 206 may be used by BTS 108 to communicate with a BSC, such as BSC 114, and may be capable of circuit-switched and/or packet-switched communication. BSC interface 206 may be capable of communicating with BSC 114 in a wired and/or wireless manner. As such, BSC interface 206 may include an Ethernet card, and may also or instead include a chipset and antenna to facilitate wireless communication.

Processor 208 may comprise multiple (e.g., parallel) processors, such as a general purpose microprocessor and/or a discrete digital signal processor. Data storage 210 may take various forms, in one or more parts, such as a non-volatile storage block and/or a removable storage medium. Data storage 210 may store program instructions 214, BTS data 216, communication protocols 218, and device management logic 220. Program instructions 214 may be executable by processor 208 to carry out various BTS functions described herein. BTS data 216 may include data related to one or more operational parameters, data reflecting measurements of the location of BTS 108, and/or any other types of data.

Communication protocols 218 may be useful to receive data from and send data to one or more network entities, and may include any suitable protocols. Compatible protocols may be stored in other entities in communication with BTS 108. Device management logic 220 may be used to manage aspects of BTS 108 such as memory and file management.

As described herein, BTS 108 could be any of a number of types of BTS. For example, BTS 108 could be a pico BTS, which again is a relatively small BTS that could be positioned in an area such as a home or office. A pico BTS might be a private BTS, in that it would not be intended for use by the public. Alternatively, BTS 108 could be a macro BTS, intended for use just as any BTS would be used in a wireless network. BTS 108 could be a portable BTS, or it could be positioned in a fixed location. Other possibilities exist as well. The present invention may be used in connection with any of these possibilities, as well as with any other type of BTS.

c. Exemplary Mobile Switching Center

Figure 3:
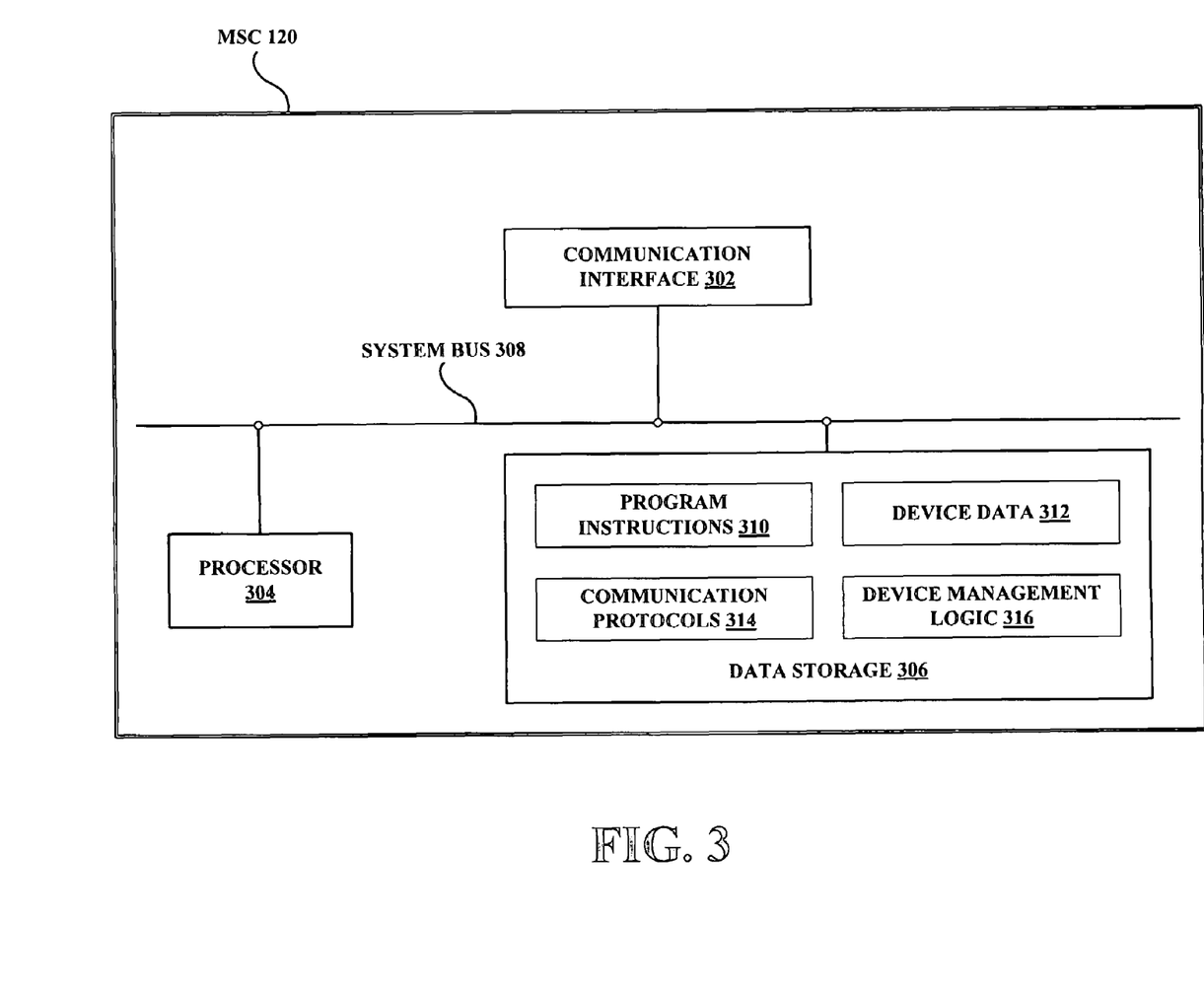
FIG. 3 is a simplified block diagram of an exemplary mobile switching center (MSC) that may be used in accordance with exemplary embodiments.

FIG. 3 is a simplified block diagram of an exemplary mobile switching center (MSC) that may be used in accordance with exemplary embodiments. In particular, FIG. 3 illustrates that MSC 120 of FIG. 1 may include a communication interface 302, a processor 304, and data storage 306, all of which may be communicatively linked by a system bus 308. In general, MSC 120 may be any device arranged to communicate with one or more BSCs and with PSTN 124, and to carry out the MSC functions described herein.

Communication interface 302 may be a combination of hardware and software enabling MSC 120 to communicate with BSCs 114 and 116, PSTN 124, and possibly one or more other entities. As such, communication interface 302 may include an interface for packet-switched communication and another for circuit-switched communication. Communication interface 302 may include an Ethernet card and may, instead or in addition, include a wireless-communication interface, which may enable it to communicate wirelessly with one or more devices or networks.

Processor 304 may comprise multiple (e.g., parallel) processors, such as a general purpose microprocessor and/or a discrete digital signal processor. Data storage 306 may take various forms, in one or more parts, such as a non-volatile storage block and/or a removable storage medium. Data storage 306 may store program instructions 310, device data 312, communication protocols 314, and device management logic 316. Program instructions 310 may be executable by processor 304 to carry out various MSC functions described herein. Device data 312 may include any type of data related to those functions.

Communication protocols 314 may be useful to receive data from and send data to one or more network entities, and may include any suitable protocols. Compatible protocols may be stored in other entities in communication with MSC 120. Device management logic 316 may be used to manage aspects of MSC 120 such as memory and file management.

3. Exemplary Operation

Figure 4:
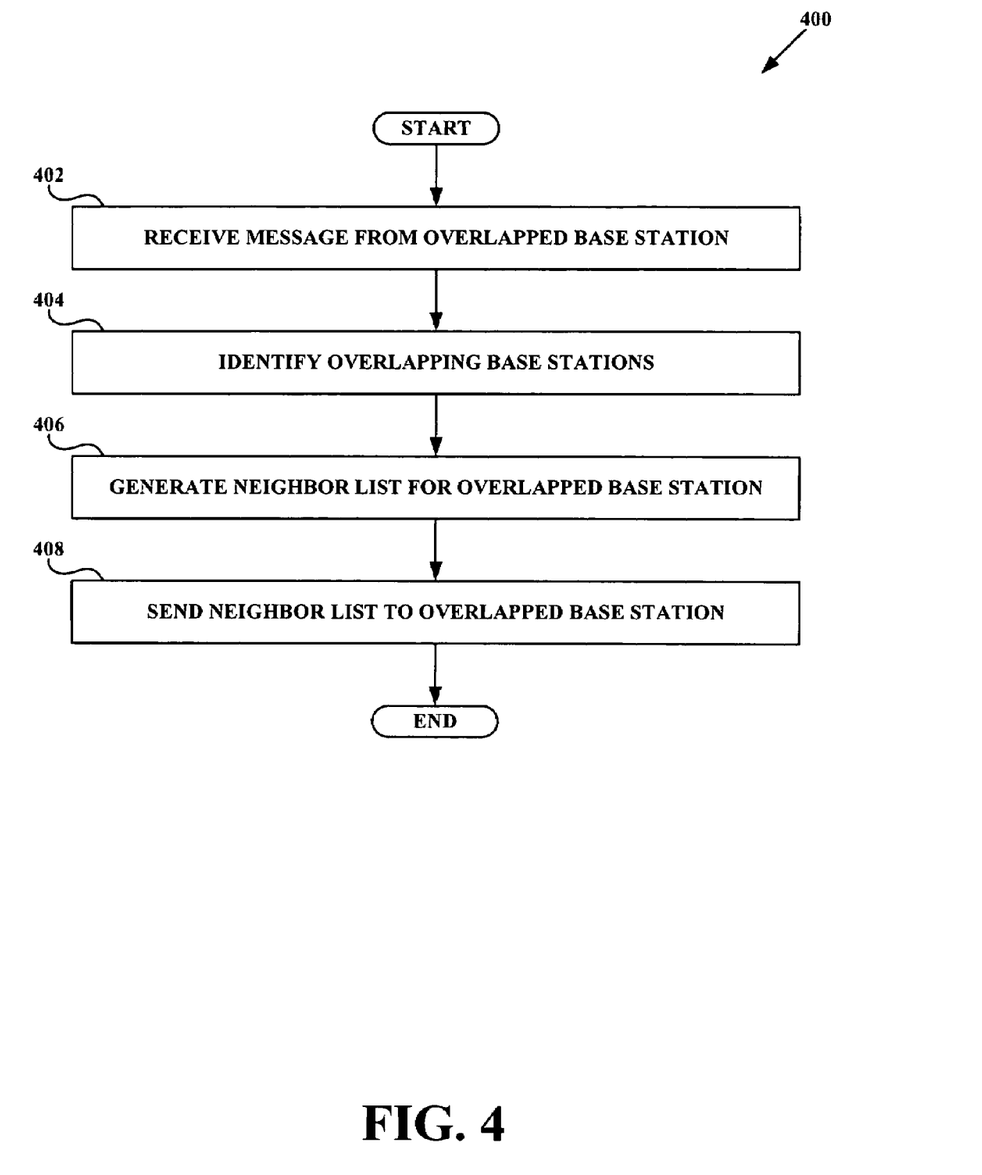
FIG. 4 is a flowchart of an exemplary method that makes use of the communication system of FIG. 1, in accordance with an exemplary embodiment.

FIG. 4 is a flowchart of an exemplary method that makes use of the communication system of FIG. 1, in accordance with an exemplary embodiment. As shown in FIG. 4, a method 400 begins at step 402, when MSC 120 receives a request message from BTS 108 (the "overlapped base station" of FIG. 4). The request message includes a location of BTS 108. At step 404, responsive to receiving the request message, based at least in part on the location of BTS 108, MSC 120 identifies a set of base stations (the "overlapping base stations" of FIG. 4) having a coverage area that overlaps the coverage area of BTS 108. Each overlapping base station has a neighbor list having a neighbor set of one or more neighboring base stations.

At step 406, MSC 120 generates a neighbor list for BTS 108 that includes the union of the set of overlapping base stations and the neighbor set of each overlapping base station. At step 408, MSC 120 sends a reply message to BTS 108, where that reply message includes the neighbor list for BTS 108. These steps are explained in the following subsections.

It should be noted as a general matter that, although method 400 is described as being carried out by MSC 120, this is not required. In other embodiments, the method 400 could be carried out by a BSC such as BSC 114, a PDSN such as PDSN 118, a gateway, a switch, a router, a server, an RNC, a SoftSwitch, an IMS, an MMD, some other network element, or perhaps some combination of these possibilities. Furthermore, the base-station functions are described with respect to method 400 as being carried out by BTS 108. In other embodiments, these base-station functions could be carried out by a combination of a BTS and a BSC, or perhaps an RNC. And other possibilities exist as well.

a. Receiving a Request Message from a Base Station

At step 402, MSC 120 receives a request message from BTS 108. In this example, BTS 108 is a pico base station and all other relevant base stations are macro base stations, though this is for illustration only. Furthermore, in this example, the communication link between BTS 108 and BSC 114 shown in FIG. 1 is a wireless packet-data connection. As described herein, BTS 108 has a coverage area. And because BTS 108 is a pico base station, this coverage area is small relative to the coverage area of the macro base stations such as BTS 110 and BTS 112.

Prior to or as part of step 402, BTS 108 may detect a triggering event. As an example of what this might involve, BTS 108 could transition from a powered-off state to a powered-on state. As another example, BTS 108 may receive a command, perhaps from a technician who is setting up BTS 108, or perhaps from a remote network entity such as MSC 120 or BSC 114. As still another example, BTS 108 may detect that a particular flag is set to a particular value, which may indicate the need for BTS 108 to acquire a neighbor list. Another possibility for a triggering event could be BTS 108 detecting one of its neighbors, such as BTS 110.

Whatever the triggering event may be that BTS 108 detects, BTS 108 may responsively determine its location, format the above-mentioned request message, and send that request message to MSC 120. BTS 108 may determine its location by using location module 204, which may involve using at least one positioning technology of the following group: GPS, Assisted GPS (A-GPS), Differential GPS (DGPS), Wide Area Augmentation System (WAAS), and tri-angulation. Whatever the method or technology employed by BTS 108 to determine its location, BTS 108 may include that location in the request message that it sends to MSC 120.

As stated above, step 402 may involve BTS 108 detecting one or more base stations such as BTS 110. BTS 108 may also include in the request message that it sends to MSC 120 an indication of any detected base stations. For example, BTS 108 could detect base stations operating using particular PN offsets, and then include those PN offsets in the request message. BTS 108 may also or instead include in the request message some other type of identifying data and/or operational data for one or more detected base stations. Note that, due to environmental conditions, BTS 108 may not be able to detect all of the base stations that are actually nearby.

BTS 108 may include additional data in the request message as well. For example, BTS 108 may include an identifier for itself, which could be any sort of identifier, such as a serial number, a MAC address, an IP address, and/or any other type of identifier. Furthermore, BTS 108 may include an indication of its own transmitting power level in the request message. And many other possibilities exist as well with respect to the type of data that BTS 108 may include in the request message that it sends to MSC 120.

b. Identifying a Set of Overlapping Base Stations

At step 404, responsive to receiving the request message in step 402, based at least in part on the location of BTS 108, MSC 120 identifies a set of one or more overlapping base stations. To include a given base station in the set of overlapping base stations means that MSC 120 concludes that the given base station has a coverage area that overlaps the coverage area of BTS 108. This conclusion may be reached in different ways, some of which are described herein.

As part of the analysis, MSC 120 may get a handle on what the expected coverage area will be for BTS 108. As part of this process, MSC 120 may use the location of BTS 108 as well as other information. For example, if the request message from BTS 108 includes a transmitting power level for BTS 108, this information coupled with the location of BTS 108 could provide MSC 120 with a "footprint" that the coverage area of BTS 108 would have.

If the request message does not include the transmitting power level of BTS 108 but instead includes a serial number for BTS 108, MSC 120 may be able to use that serial number to look up data such as a transmitting power level and/or expected coverage radius for that BTS. It is often the case that a serial number for a BTS would indicate the manufacturer of that BTS and, in that manufacturer's particular coding system, also indicate a transmitting power level.

In other embodiments, the particular type of request message that is received by MSC 120 may itself indicate how far the coverage area of BTS 108 would extend around the location of that BTS. And other possibilities exist as well, such as MSC 120 using another type of identifier for BTS 108, such as a MAC address or IP address, to look up information that will aid MSC 120 in determining the coverage footprint for BTS 108. Furthermore, if the request message sent from BTS 108 to MSC 120 includes an indication of one or more base stations that were detected by BTS 108, this information could be used by MSC 120 to derive and/or confirm the particular coverage area of BTS 108.

As an additional part of the analysis used in identifying the set of macro base stations whose coverage areas overlap the coverage area of the pico base station 108, the coverage areas of those macro base stations need to be considered as well. MSC 120 may have data pertaining to the locations of the macro base stations in the network, as well as data pertaining to their respective transmitting powers, which may be somewhat uniform if the macro base stations are of the same type. Thus, the set of overlapping base stations may be identified by determining which base stations are close—i.e., less than the distance that their respective transmitting power would cover—to the coverage area of BTS 108.

Other algorithms could be used as well however, such as searching for macro base stations having coverage areas that have at least one point—or a sufficient number of points—on a particular coverage map in common with the coverage area of BTS 108. And many other possibilities exist as well. In any event, each macro base station in the identified set of overlapping base stations will have its own neighbor list. MSC 120 may have these neighbor lists stored, or may instead acquire these neighbor lists by querying a database, or perhaps by querying the overlapping macro base stations themselves. Each of these neighbor lists for the overlapping base station will include a "neighbor set" of one or more base stations that are neighbors with respect to the overlapping macro base station in question.

c. Generating a Neighbor List

At step 406, MSC 120 generates a neighbor list for BTS 108. This neighbor list includes the union of (i) the set of overlapping base stations identified in step 404 and (ii) the neighbor set from the neighbor list of each overlapping base station in that set of overlapping base stations. Thus, the generated neighbor list for BTS 108 includes each of the base stations whose coverage areas overlap that of BTS 108, as well as each of those base stations' neighbors. Several examples of neighbor-list generation are detailed below, where the coverage area of BTS 108 overlaps one, two, and three macro coverage areas.

Figure 5:
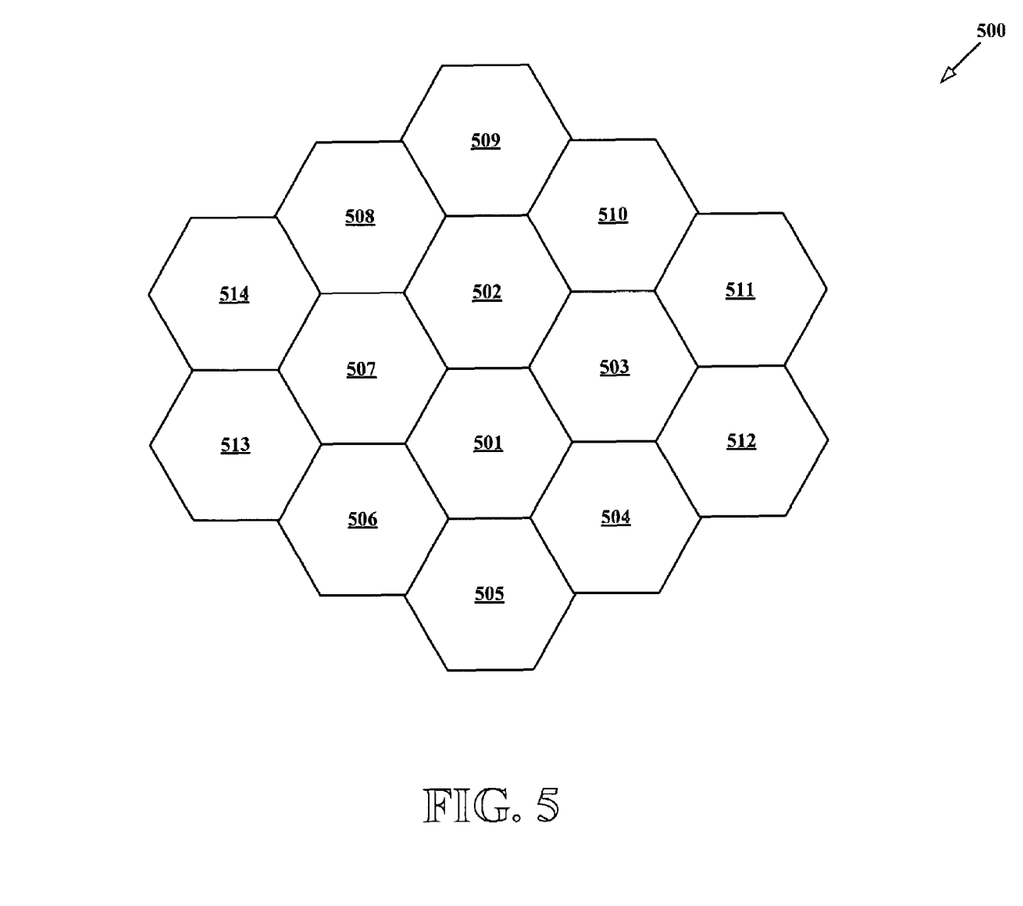
FIG. 5 is a simplified block diagram showing an exemplary map of macro base-station coverage areas in a wireless network, in accordance with exemplary embodiments.

FIG. 5 provides a framework for the ensuing three examples. In particular, FIG. 5 is a simplified block diagram showing an exemplary map of macro base-station coverage areas in a wireless network, in accordance with exemplary embodiments. FIG. 5 depicts a coverage map 500, which includes coverage areas for fourteen macro base stations 501-

514. Each coverage area is represented in FIG. 5 by a hexagon. In actuality, a coverage area of a base station may have a substantially circular shape when viewed from above, or perhaps have an irregular shape, depending on the topology of the surrounding area. In any event, the hexagonal coverage areas are used in FIG. 5 and in the art so that the coverage areas can more easily be depicted as locking together to blanket a particular geographic area in wireless coverage.

Each of these base stations 501-514 may have a neighbor list, each of which may be defined as the "neighbor set" of "neighboring" base stations whose coverage areas are adjacent to the particular base station's coverage area. Note that definitions of "neighbors" could extend beyond those coverage areas that are adjacent, and that this is used for illustration. Thus, several exemplary neighbor lists may be listed here for use in the ensuing examples. For example, base station 501 may have a neighbor list NL(501) equal to {502, 503, 504, 505, 506, 507}. Base station 502 may have a neighbor list NL(502) equal to {501, 503, 507, 508, 509, 510}. Base station 503 may have a neighbor list NL(503) equal to {501, 502, 504, 510, 511, 512}. Finally, base station 507 may have a neighbor list NL(507) equal to {501, 502, 506, 508, 513, 514}.

Figure 6:
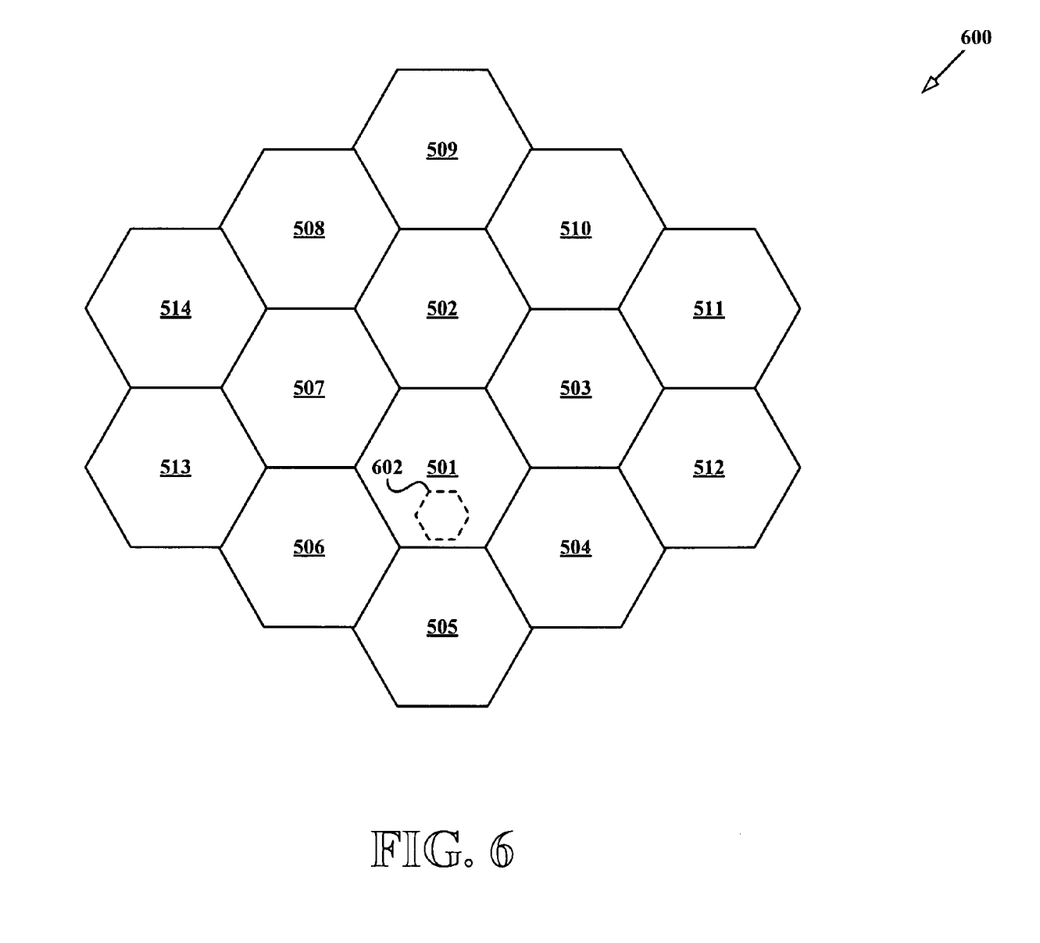
FIG. 6 is a simplified block diagram depicting a pico base station whose coverage area is overlapped by a single macro-base-station coverage area from the exemplary map of FIG. 5, in accordance with exemplary embodiments.

For the first example, FIG. 6 is a simplified block diagram depicting a pico base station whose coverage area is overlapped by a single macro-base-station coverage area from the exemplary map of FIG. 5, in accordance with exemplary embodiments. As shown in the coverage map 600 of FIG. 6, a coverage area of a pico base station 602, which may be similar to BTS 108, is overlapped by one macro-base-station coverage area, namely that of macro base station 501. The set of overlapping base stations for pico base station 602 is thus equal to {501}. The set of base stations to include in the neighbor list for pico base station 602 is thus equal to the union of that set and the neighbor set for each base station in that set, or the union of {501} and NL(501). The union of any number of sets is a set containing all of the elements that are elements of any of those sets. Here, the union being computed is that of {501} and {502, 503, 504, 505, 506, 507}. Thus, the neighbor list that would be generated in step 406 for pico base station 602 would be {501, 502, 503, 504, 505, 506, 507}.

Figure 7:
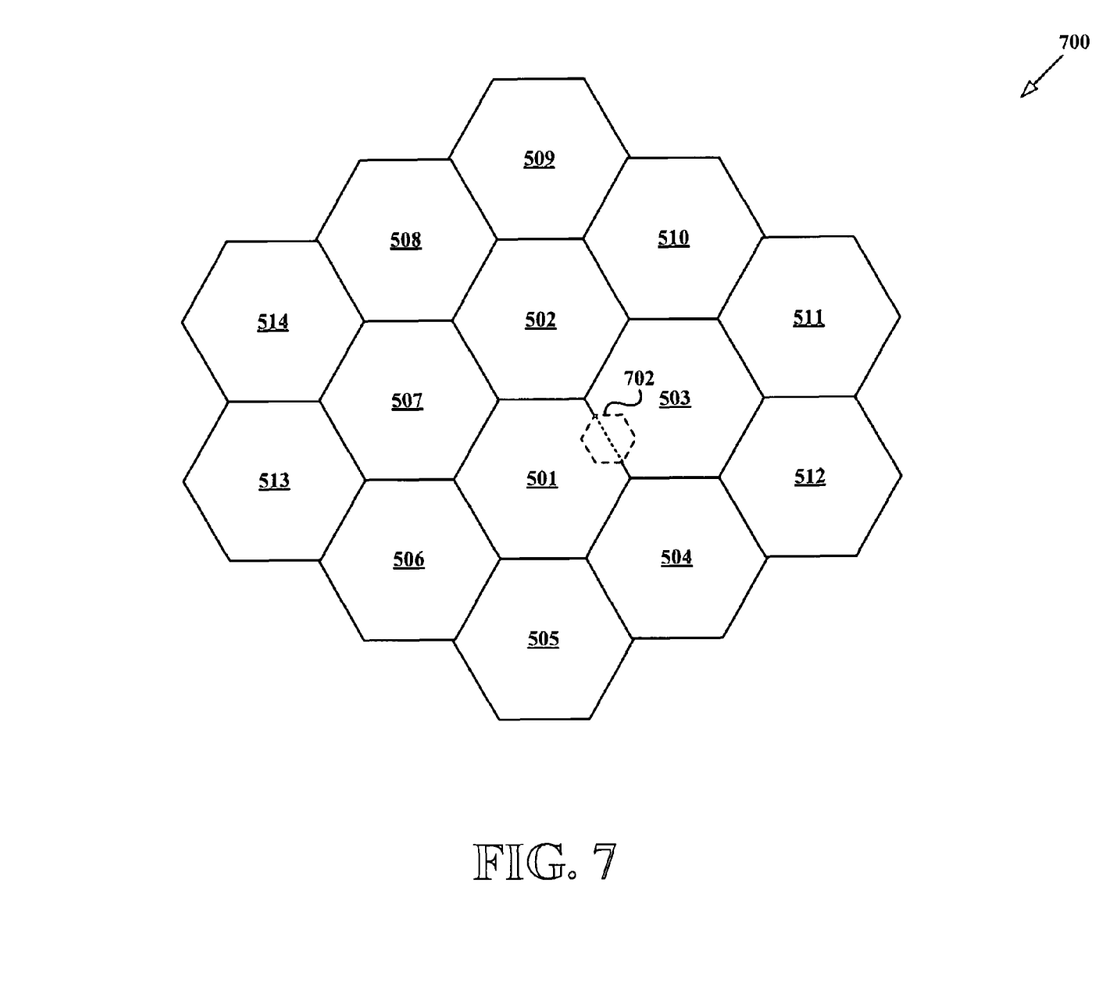
FIG. 7 is a simplified block diagram depicting a pico base station whose coverage area is overlapped by two macro-base-station coverage areas from the exemplary map of FIG. 5, in accordance with exemplary embodiments.

For the second example, FIG. 7 is a simplified block diagram depicting a pico base station whose coverage area is overlapped by two macro-base-station coverage areas from the exemplary map of FIG. 5, in accordance with exemplary embodiments. As shown in the coverage map 700 of FIG. 7, a coverage area of a pico base station 702 is overlapped by two macro-base-station coverage areas, namely that of macro base stations 501 and 503. The set of overlapping base stations for pico base station 702 is thus equal to {501, 503}.

The set of base stations to include in the neighbor list for pico base station 702 is thus equal to the union of that set and the neighbor set for each base station in that set, or the union of {501, 503}, NL(501), and NL(503). This equals the union of {501, 503}, {502, 503, 504, 505, 506, 507}, and {501, 502, 504, 510, 511, 512}. Thus, the neighbor list that would be generated for pico base station 702 would be {501, 502, 503, 504, 505, 506, 507, 510, 511, 512}.

Figure 8:
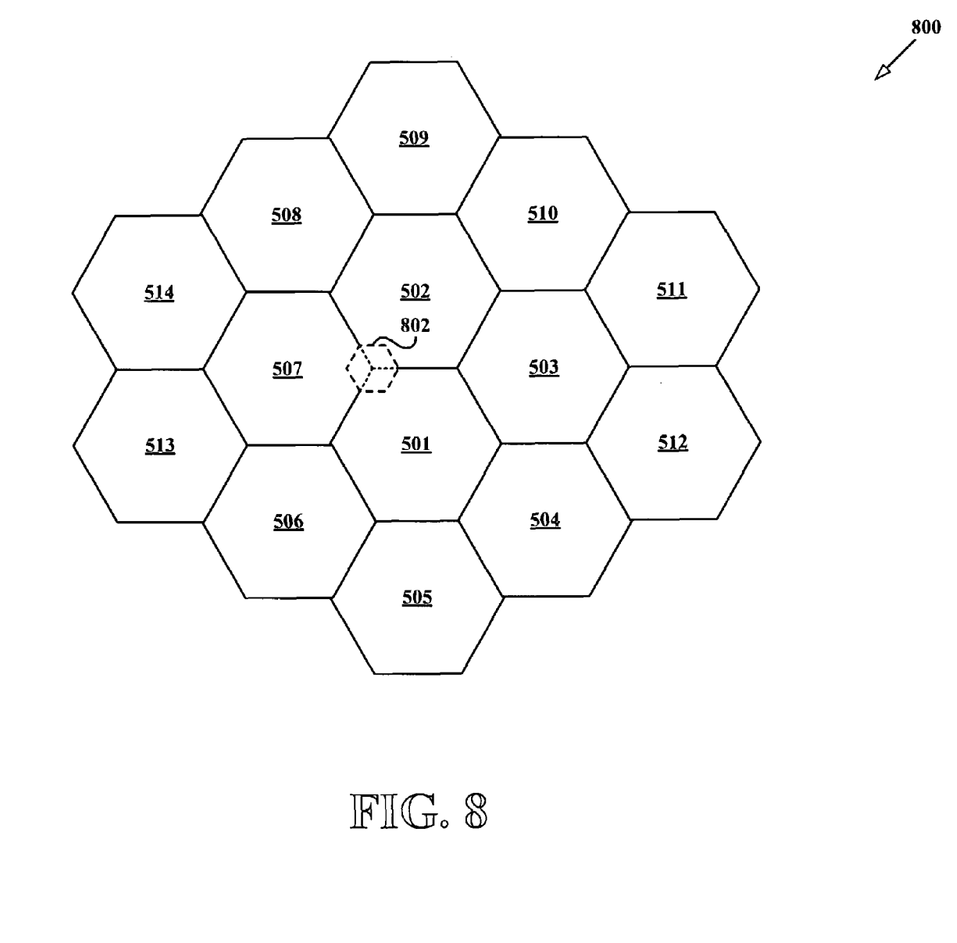
FIG. 8 is a simplified block diagram depicting a pico base station whose coverage area is overlapped by three macro-base-station coverage areas from the exemplary map of FIG. 5, in accordance with exemplary embodiments.

For the third example, FIG. 8 is a simplified block diagram depicting a pico base station whose coverage area is overlapped by three macro-base-station coverage areas from the exemplary map of FIG. 5, in accordance with exemplary embodiments. As shown in the coverage map 800 of FIG. 8, a coverage area of a pico base station 802 is overlapped by three macro-base-station coverage areas, namely that of macro base stations 501, 502, and 507. The set of overlapping base stations for pico base station 802 is thus equal to {501, 502, 507}.

The set of base stations to include in the neighbor list for pico base station 802 is thus equal to the union of that set and the neighbor set for each base station in that set, or the union of {501, 502, 507}, NL(501), NL(502), and NL(507). This equals the union of {501, 502, 507}, {502, 503, 504, 505, 506, 507}, {501, 503, 507, 508, 509, 510}, and {501, 502, 506, 508, 513, 514}. Thus, the neighbor list that would be generated for pico base station 802 would be {501, 502, 503, 504, 505, 506, 507, 508, 509, 510, 513, 514}. And further examples are possible.

d. Sending the Neighbor List to the Base Station

At step 408, MSC 120 sends a reply message to BTS 108, in reply to the request message received at step 402. This reply message includes the neighbor list for BTS 108 that was generated in step 406. BTS 108 may receive this reply message, extract the included neighbor list, and then subsequently broadcast that neighbor list in the coverage area of BTS 108.

After or as part of carrying out step 408, MSC 120 may update the neighbor lists of the overlapping base stations to include BTS 108. MSC 120 may further update the neighbor lists of each of the base stations listed on the neighbor lists of the overlapping base stations to include BTS 108. To update a given base station's neighbor list, MSC 120 may send a complete neighbor list to the given base station, where that complete neighbor list includes BTS 108. MSC 120 may instead send an update message to the given base station, instructing that base station to add BTS 108 to the given base station's neighbor list. And other possibilities exist as well, such as MSC 120 sending a more general message to the given base station, instructing that given base station to request a new neighbor list or to take some other step or combination of steps to accomplish an update to its neighbor list. Still other possibilities exist as well.

4. Conclusion

Various exemplary embodiments have been described above. Those skilled in the art will understand, however, that changes and modifications may be made to those examples without departing from the scope of the claims.

What is claimed is:

1. A method comprising:
receiving a first message from an overlapped base station, wherein the overlapped base station has a first coverage area, and wherein the first message comprises a location of the overlapped base station;
responsive to receiving the first message, identifying a set of one or more overlapping base stations based at least in part on the location of the overlapped base station, wherein each overlapping base station has a respective coverage area that overlaps the first coverage area, and wherein each overlapping base station further has a respective neighbor list that includes a neighbor set of one or more neighboring base stations of that overlapping base station;
generating a first neighbor list comprising the union of the set of overlapping base stations and the neighbor set of each overlapping base station; and
sending a second message to the overlapped base station, wherein the second message comprises the first neighbor list, wherein the overlapped base station receives the second message and broadcasts the first neighbor list in the first coverage area.

2. The method of claim 1, wherein the overlapped base station is a pico base station.

3. The method of claim 2, wherein the overlapping base stations are macro base stations.

4. The method of claim 1, wherein the overlapped base station comprises a base transceiver station (BTS).

5. The method of claim 1, wherein the overlapped base station comprises a base transceiver station (BTS) and a base station controller (BSC).

6. The method of claim 1, further comprising updating the neighbor lists of the overlapping base stations to include the overlapped base station.

7. The method of claim 6, further comprising updating the neighbor lists of the neighboring base stations of the overlapping base stations to include the overlapped base station.

8. The method of claim 1, further comprising:
the overlapped base station determining its location; and
the overlapped base station sending the first message.

9. The method of claim 8, wherein the overlapped base station determines its location using at least one positioning technology selected from the group consisting of Global Positioning System (GPS), Assisted GPS (A-GPS), Differential GPS (DGPS), Wide Area Augmentation System (WAAS), and triangulation.

10. The method of claim 8, further comprising the overlapped base station detecting one or more of the overlapping base stations, wherein the first message further comprises an indication of the detected base stations, and wherein identifying the set of overlapping base stations based at least in part on the location of the overlapped base station comprises identifying the set of overlapping base stations based at least in part on the location of the overlapped base station and at least in part on the indication of the detected base stations.

11. The method of claim 8, wherein the first message further comprises additional data comprising at least one of an identifier of the overlapped base station and a power level of the overlapped base station, and wherein identifying the set of overlapping base stations based at least in part on the location of the overlapped base station comprises identifying the set of overlapping base stations based at least in part on the location of the overlapped base station and at least in part on the additional data.

12. The method of claim 8, further comprising the overlapped base station detecting a triggering event selected from the group consisting of receiving a command, transitioning to a powered-on state, determining that a flag is set to a particular value, and detecting one or more of the overlapping base stations, wherein the overlapped base station determines its location and sends the first message in response to detecting the triggering event.

13. The method of claim 1, carried out by one or more devices selected from the group consisting of a mobile switching center (MSC), a base station controller (BSC), a Radio Network Controller (RNC), a SoftSwitch, an IP Multimedia Subsystem (IMS), a Multimedia Domain (MMD), a packet data serving node (PDSN), a gateway, a switch, a router, and a server.

14. A neighbor-list controller comprising:
a communication interface;
a processor; and
data storage having stored therein instructions executable by the processor to:
receive a first message from an overlapped base station, wherein the overlapped base station has a first coverage area, and wherein the first message comprises a location of the overlapped base station;
responsive to receiving the first message, identify a set of one or more overlapping base stations based at least in part on the location of the overlapped base station, wherein each overlapping base station has a respective coverage area that overlaps the first coverage area, and wherein each overlapping base station further has a respective neighbor list that includes a neighbor set of one or more neighboring base stations of that overlapping base station;
generate a first neighbor list comprising the union of the set of overlapping base stations and the neighbor set of each overlapping base station; and
send a second message to the overlapped base station, wherein the second message comprises the first neighbor list, wherein the overlapped base station receives the second message and broadcasts the first neighbor list in the first coverage area.

15. The neighbor-list controller of claim 14, wherein the overlapped base station is a pico base station, and wherein the overlapping base stations are macro base stations.

16. The neighbor-list controller of claim 14, wherein the data storage further has stored therein instructions to update the neighbor lists of the overlapping base stations to include the overlapped base station.

17. The neighbor-list controller of claim 16, wherein the data storage further has stored therein instructions to update the neighbor lists of the neighboring base stations of the overlapping base stations to include the overlapped base station.

18. The neighbor-list controller of claim 14, wherein the first message further comprises additional data comprising at least one of an indication of one or more of the overlapping base stations detected by the overlapped base station, an identifier of the overlapped base station, and a power level of the overlapped base station, and wherein the instructions to identify the set of one or more overlapping base stations based at least in part on the location of the overlapped base station comprise instructions to identify the set of one or more overlapping base stations based at least in part on the location of the overlapped base station and at least in part on the additional data.

19. The neighbor-list controller of claim 14, wherein the neighbor-list controller comprises one or more devices selected from the group consisting of a mobile switching center (MSC), a base station controller (BSC), a Radio Network Controller (RNC), a SoftSwitch, an IP Multimedia Subsystem (IMS), a Multimedia Domain (MMD), a packet data serving node (PDSN), a gateway, a switch, a router, and a server.

* * * * *

UNITED STATES PATENT AND TRADEMARK OFFICE
CERTIFICATE OF CORRECTION

PATENT NO. : 7,623,866 B1  Page 1 of 1
APPLICATION NO. : 11/484001
DATED : November 24, 2009
INVENTOR(S) : Roy L. Spitzer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this

Twenty-sixth Day of October, 2010

David J. Kappos
*Director of the United States Patent and Trademark Office*